United States Patent
Kozakai et al.

(10) Patent No.: US 7,312,296 B2
(45) Date of Patent: *Dec. 25, 2007

(54) SILICONE ADHESIVE AND ADHESIVE FILM

(75) Inventors: Shouhei Kozakai, Gunma-ken (JP); Akio Suzuki, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 491 days.

This patent is subject to a terminal disclaimer.

(21) Appl. No.: 10/644,976

(22) Filed: Aug. 21, 2003

(65) Prior Publication Data

US 2004/0044132 A1    Mar. 4, 2004

(30) Foreign Application Priority Data

Aug. 21, 2002  (JP)  .............................. 2002-240373

(51) Int. Cl.
*C08G 77/08*   (2006.01)

(52) U.S. Cl. ........................... 528/15; 528/24; 528/31; 528/32; 528/33; 528/34; 525/474; 525/477; 525/478

(58) Field of Classification Search ................ 528/15, 528/24, 31, 32, 33, 34; 525/474, 477, 478
See application file for complete search history.

(56) References Cited

U.S. PATENT DOCUMENTS

| | | | | |
|---|---|---|---|---|
| 3,983,265 A | * | 9/1976 | Letoffe | 427/58 |
| 4,143,088 A | * | 3/1979 | Favre et al. | 525/477 |
| 5,248,739 A | * | 9/1993 | Schmidt et al. | 525/477 |
| 5,340,887 A | | 8/1994 | Vincent et al. | |
| 5,389,170 A | * | 2/1995 | Brady et al. | 156/109 |
| 5,415,912 A | * | 5/1995 | Ushizaka et al. | 428/41.4 |
| 5,508,360 A | * | 4/1996 | Cifuentes et al. | 525/477 |
| 5,580,915 A | * | 12/1996 | Lin | 524/267 |
| 5,776,614 A | * | 7/1998 | Cifuentes et al. | 428/447 |
| 5,916,981 A | * | 6/1999 | Cifuentes et al. | 525/477 |
| 5,973,061 A | * | 10/1999 | Feder et al. | 524/588 |
| 6,387,487 B1 | * | 5/2002 | Greenberg et al. | 428/355 R |
| 6,777,471 B1 | * | 8/2004 | Dalbe et al. | 524/268 |
| 2002/0013386 A1 | * | 1/2002 | Aoki | 523/176 |
| 2002/0086942 A1 | * | 7/2002 | Fujita et al. | 525/100 |

FOREIGN PATENT DOCUMENTS

| | | | |
|---|---|---|---|
| JP | 05-004995 | * | 1/1993 |
| JP | 7-53871 A | | 2/1995 |
| JP | 7-53942 A | | 2/1995 |
| JP | 7-70541 A | | 3/1995 |
| JP | 9-67558 A | | 3/1997 |
| WO | 00/32694 | * | 6/2000 |

* cited by examiner

*Primary Examiner*—Kuo-Liang Peng
(74) *Attorney, Agent, or Firm*—Birch, Stewart, Kolasch & Birch, LLP

(57) ABSTRACT

A silicone adhesive having (A) an organopolysiloxane partial condensate of (i) a diorganopolysiloxane end-capped with a hydroxyl radical and (ii) an organopolysiloxane copolymer having hydroxyl radicals and having $R^3_3SiO_{1/2}$ units and $SiO_{4/2}$ units wherein $R^3$ is hydroxyl or a monovalent hydrocarbon radical, (B) a silane or siloxane compound having a silicon atom-bonded alkoxy radical and/or an epoxy radical, and (C) a crosslinking agent exhibits pressure-sensitive adhesion and permanent adhesion.

9 Claims, No Drawings

SILICONE ADHESIVE AND ADHESIVE FILM

This invention relates to a silicone adhesive exhibiting pressure-sensitive adhesion to a variety of substrates, developing permanent adhesion upon heating and suited for use in semiconductor device manufacture, and an adhesive film obtained by forming the adhesive into a film shape.

BACKGROUND OF THE INVENTION

Like silicone oils and silicone rubbers, silicone-based pressure-sensitive adhesives have heat resistance, freeze resistance, electric insulation, weather resistance, water resistance and non-toxicity characteristic of the polysiloxane structure involved. Since organic polymer-based pressure-sensitive adhesives are highly adherent to fluoro-resins and silicone rubbers which are otherwise difficult to bond, they comply with a wide variety of substrates and are used in a wide range of application. They are especially suited for use in the manufacture of electronic parts, because of high purity, high heat resistance, low Tg, low modulus of elasticity, high electric resistance and low dielectric constant.

Prior art silicone-based pressure-sensitive adhesives are used in the application where bond strength is not so required, for example, as protective tape, securing tape or masking tape and for substrate attachment. However, these adhesives are recently required to develop initially pressure-sensitive adhesion (or tackiness) and subsequently permanent adhesion to various substrates.

In one application, a silicone adhesive which changes from pressure-sensitive adhesion (or tackiness) to permanent adhesion is expected, from the reliability standpoint of silicone resin, to find use as a dicing/die bonding tape which is believed useful in the manufacture of semiconductor devices.

In the manufacture of semiconductor devices, a large diameter silicon wafer is secured by a pressure-sensitive adhesive tape (known as dicing tape) and subjected to a dicing (sawing and separating) step where the wafer is divided into semiconductor chips. The chips are then peeled from the dicing tape. The chip thus taken out is secured to a lead frame with a curable liquid adhesive (or die bonding agent) through heat compression bonding. A simpler process is needed. The contamination of semiconductor parts with fluid ingredients from the liquid adhesive is also an issue of recent concern. It is then desired to have a dicing/die bonding tape in the form of a pressure-sensitive adhesive sheet serving as both the pressure-sensitive adhesive layer of the dicing tape and the die bonding agent. The pressure-sensitive adhesive (dicing)/die bonding layer needs to develop a tack force (or attachment) to withstand the dicing operation and to adhere to the chip being taken away in the initial dicing step and needs to further develop a strong bond to the lead frame in the subsequent die bonding step.

The pressure-sensitive adhesive (dicing)/die bonding layer of the dicing/die bonding tape is proposed in JP-A 9-67558 as comprising polyimide resins. On account of a high glass transition temperature (Tg) and a high modulus of elasticity, the polyimide resins are insufficient to mitigate the thermal stress between bonded substrates of semiconductor parts. To enhance reliability, there is a need for a dicing/die bonding tape comprising a silicone resin having a low Tg and a low modulus of elasticity enough for stress mitigation.

Silicone pressure-sensitive adhesives of the type that changes from tackiness to permanent adhesiveness are disclosed in JP-A 7-53871, JP-A 7-53942 and U.S. Pat. No. 5,340,887 (JP-A 7-70541). They establish a bond through crosslinking and curing with moisture. However, a long term of several days to several weeks is necessary until these pressure-sensitive adhesives acquire a substantial bond strength. Such extremely low productivity prevents the adhesives from being applied as the dicing/die bonding layer for use in the manufacture of semiconductor devices.

SUMMARY OF THE INVENTION

Therefore, an object of the present invention is to provide a silicone adhesive capable of developing initially pressure-sensitive adhesion (or tackiness) and subsequently a strong bond (or adhesiveness) to a substrate through brief heat compression so that it is applicable as the dicing/die bonding layer. Another object is to provide an adhesive film obtained by forming the adhesive into a film shape.

We have discovered that by compounding a crosslinkable organopolysiloxane partial condensate composed of a chain-like organopolysiloxane and a solid silicone resin with a silane or siloxane compound, a silicone adhesive is formulated which can be sheeted into an adhesive film and that this silicone adhesive can develop initially pressure-sensitive adhesion (or tackiness) and subsequently form a strong bond to a substrate through brief heat compression so that it is applicable as the dicing/die bonding layer.

As used herein, the term "adhesive film" denotes an adhesive sheet and tape commonly used in the art as well as a film.

Accordingly the present invention provides a silicone adhesive exhibiting pressure-sensitive adhesion and permanent adhesion, comprising (A) 100 parts by weight of an organopolysiloxane partial condensate obtained by partial condensation of (i) a diorganopolysiloxane having a hydroxyl radical at an end of its molecular chain, represented by the following general formula (1):

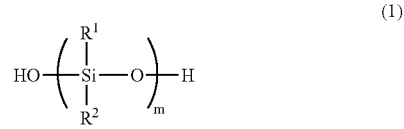

wherein $R^1$ and $R^2$ each are a substituted or unsubstituted monovalent hydrocarbon radical, and m is an integer of 500 to 10,000, with (ii) an organopolysiloxane copolymer having hydroxyl radicals in a molecule and consisting essentially of $R^3{}_3SiO_{1/2}$ units and $SiO_{4/2}$ units in a molar ratio of $R^3{}_3SiO_{1/2}$ units to $SiO_{4/2}$ units of from 0.5 to 1.5, wherein $R^3$ is a hydroxyl radical or a substituted or unsubstituted monovalent hydrocarbon radical, (B) 0.1 to 20 parts by weight of a silane or siloxane compound having a silicon atom-bonded alkoxy radical and an organic radical or atom selected from the group consisting of an alkenyl radical, an epoxy radical and a silicon atom-bonded hydrogen atom, a silane or siloxane compound having an epoxy radical and a silicon atom-bonded hydrogen atom, or a mixture thereof, and (C) a crosslinking agent.

Also contemplated herein are a silicone adhesive film prepared by forming the adhesive into a film shape, and a silicone rubber adhesive film prepared by forming the adhesive into a film shape, followed by crosslinking and curing.

DESCRIPTION OF THE PREFERRED EMBODIMENTS

Component (A)

Component (A) in the silicone adhesive of the invention is a partially condensed product of (i) a diorganopolysiloxane and (ii) an organosiloxane resin. Component (i) is a diorganopolysiloxane having a hydroxyl radical at an end of its molecular chain and represented by the following general formula (1).

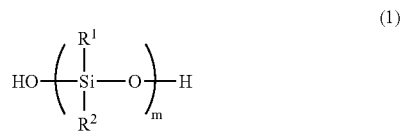

Herein $R^1$ and $R^2$ each are a substituted or unsubstituted monovalent hydrocarbon radical, and m is an integer of 500 to 10,000.

In formula (1), each of $R^1$ and $R^2$ is a substituted or unsubstituted monovalent hydrocarbon radical, preferably having 1 to 20 carbon atoms, more preferably 1 to 10 carbon atoms. Examples include alkyl radicals such as methyl, ethyl, propyl, butyl, pentyl, and hexyl, aryl radicals such as phenyl, tolyl and xylyl, halogenated alkyl radicals such as chloromethyl and 3,3,3-trifluoropropyl, and alkenyl radicals such as vinyl, allyl, butenyl and pentenyl, with methyl, vinyl and phenyl being preferred. In one embodiment wherein the crosslinking agent (C) is an organohydrogenpolysiloxane/platinum base catalyst system, the diorganopolysiloxane (i) should contain alkenyl radicals. Also in another embodiment wherein the crosslinking agent (C) is an organic peroxide, the inclusion of alkenyl radicals is preferred. The content of alkenyl radicals is 0.02 to 0.5 mol % based on the total of $R^1$ and $R^2$.

The subscript m is an integer of 500 to 10,000, preferably 1,000 to 5,000. If m is less than 500, the adhesive does not become tacky. If m is more than 10,000, formation of an adhesive layer becomes difficult.

Component (ii) is an organopolysiloxane copolymer having hydroxyl radicals in a molecule and consisting essentially of $R^3_3SiO_{1/2}$ units and $SiO_{4/2}$ units.

$R^3$ is a hydroxyl radical or a substituted or unsubstituted monovalent hydrocarbon radical, preferably having 1 to 20 carbon atoms, more preferably 1 to 10 carbon atoms. Examples of suitable hydrocarbon radicals include alkyl radicals such as methyl, ethyl, propyl, butyl, pentyl, and hexyl, aryl radicals such as phenyl, tolyl and xylyl, halogenated alkyl radicals such as chloromethyl and 3,3,3-trifluoropropyl, and alkenyl radicals such as vinyl, allyl, butenyl and pentenyl, with methyl being most preferred.

The organopolysiloxane copolymer has hydroxyl radicals in a molecule. Exactly stated, the copolymer should preferably have at least one hydroxyl radical in a molecule.

The molar ratio of $R^3_3SiO_{1/2}$ units to $SiO_{4/2}$ units is in the range between 0.5 and 1.5, preferably in the range between 0.6 and 1.1. If this molar ratio is less than 0.5 or more than 1.5, the inventive composition does not become tacky.

With respect to the blending proportion, it is preferred to blend 30 to 70 parts by weight of component (i) with 70 to 30 parts by weight of component (ii), and more preferably 40 to 60 parts by weight of component (i) with 60 to 40 parts by weight of component (ii), provided that the total of components (i) and (ii) is 100 parts by weight. If the proportion of component (ii) is less than 30 parts by weight or more than 70 parts by weight, tackiness may be lost.

Component (A) is obtained through partial condensation of hydroxyl (or silanol) radicals in components (i) and (ii). It can be obtained by a well-known technique, for example, by adding components (i) and (ii) to a suitable miscible solvent, adding ammonia as a condensation catalyst and heating the solution to effect dehydration condensation. It is noted that the molecular weight of component (i) is overwhelmingly (at least 20 times) greater than the molecular weight of component (ii). For this reason, although condensation can occur between components (i) and (ii), only a portion of component (ii) condenses with component (i) and the majority of component (ii) remains uncondensed. No condensation can occur between molecules of component (ii). Consequently, component (A) becomes a partially condensed product.

Component (B)

Component (B) is a compound containing a silicon atom-bonded alkoxy radical and/or an epoxy radical capable of bonding to substrates upon heating, namely a silane or siloxane compound having a silicon atom-bonded alkoxy radical and an organic radical or atom selected from the group consisting of an alkenyl radical, an epoxy radical and a silicon atom-bonded hydrogen atom (i.e., Si—H radical), a silane or siloxane compound having an epoxy radical and a silicon atom-bonded hydrogen atom (i.e., Si—H radical), or a mixture thereof.

The alkoxy radicals are preferably those of 1 to 6 carbon atoms, especially 1 to 3 carbon atoms, and the alkenyl radicals are preferably those of 2 to 10 carbon atoms, especially 2 to 3 carbon atoms. Examples of these radicals are as exemplified above.

Illustrative of the compound are silane compounds such as vinyltrimethoxysilane, vinylmethyldimethoxysilane, vinyltriethoxysilane, acryloxypropyltrimethoxysilane, acryloxypropylmethyldimethoxysilane, acryloxypropyltriethoxysilane, methacryloxypropyltrimethoxysilane, methacryloxypropylmethyldimethoxysilane, methacryloxypropyltriethoxysilane, and glycidoxypropyltrimethoxysilane, glycidoxypropyltriethoxysilane. Examples of suitable siloxane compounds are given below.

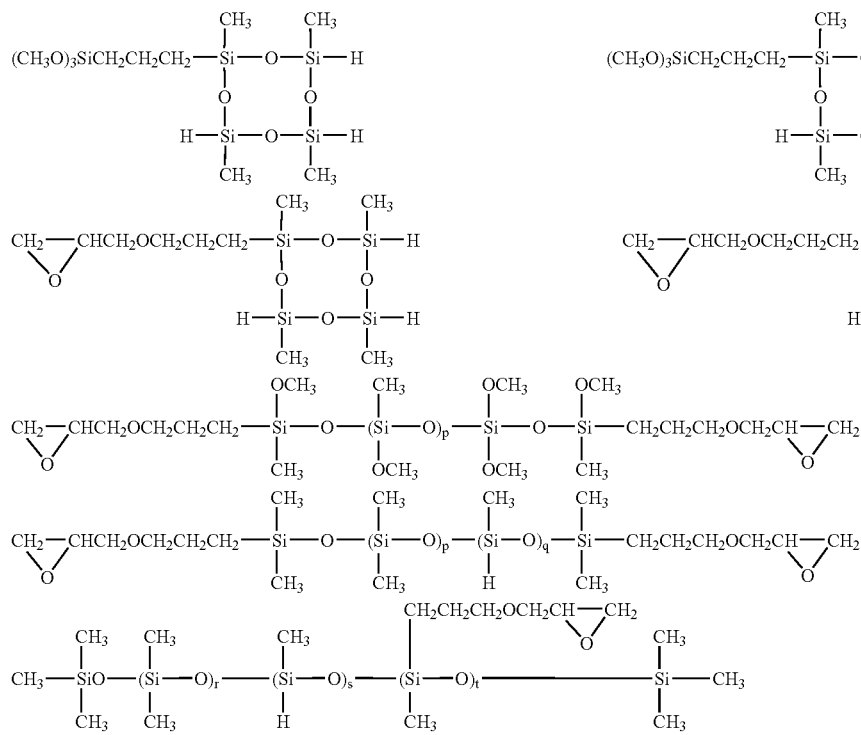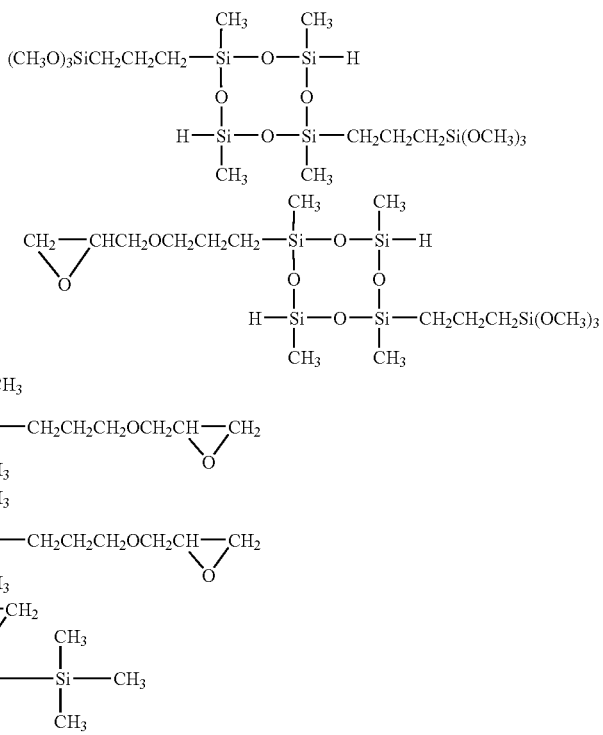

Note that p and r each are an integer of 0 to 50, q, s and t each are an integer of 1 to 50.

Also useful are organosilane or organosiloxane-modified isocyanurate compounds as shown below.

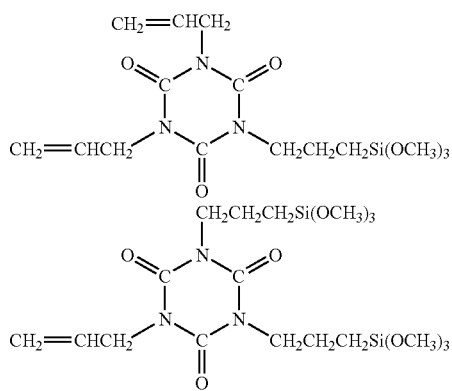

Of the foregoing compounds, the organosilane or organosiloxane-modified isocyanurate compounds are preferred for use in the invention.

The compounds serving as component (B) can be synthesized by the methods disclosed in JP-B 63-46783 and JP-B 53-13508 or the like.

Component (B) is blended in an amount of 0.1 to 20 parts by weight, preferably 0.5 to 10 parts by weight per 100 parts by weight of component (A). Less than 0.1 part of component (B) is insufficient to provide adhesiveness whereas more than 20 parts of component (B) may adversely affect adhesiveness or cause under-cure.

Component (C)

Component (C) is a crosslinking agent which is not critical as long as it can incur crosslinking of component (A) and form chemical bonds of component (B) to component (A). Most often, the crosslinking agent (C) is an organic peroxide or a combination of an organohydrogenpolysiloxane having silicon atom-bonded hydrogen atoms (i.e., Si—H radicals) with a platinum base catalyst.

The crosslinking of component (A) induced by the organic peroxide takes place through either bonding between silicon atom-bonded hydrocarbon radicals in component (A) or bonding between alkenyl radicals, depending on the type of organic peroxide. In the latter case, it is requisite that component (A) contain alkenyl radicals. On the other hand, the crosslinking of component (A) induced by the organohydrogenpolysiloxane/platinum base catalyst system takes place through addition crosslinking between alkenyl radicals in component (A) and silicon atom-bonded hydrogen atoms in the organohydrogenpolysiloxane in the presence of the platinum base catalyst. It is requisite in this case too that component (A) contain alkenyl radicals.

Likewise, the chemical bonding of component (B) to component (A) induced by the organic peroxide takes place through either bonding between silicon atom-bonded hydrocarbon radicals in component (A) and hydrocarbon radicals in component (B) with the aid of the organic peroxide or bonding between alkenyl radicals in components (A) and (B) with the aid of the organic peroxide. On the other hand, the chemical bonding of component (B) to component (A) induced by the organohydrogenpolysiloxane/platinum base catalyst system takes place through either addition bonding between alkenyl radicals in components (A) and (B) and the organohydrogenpolysiloxane promoted by the platinum base catalyst or addition bonding between alkenyl radicals in component (A) and silicon atom-bonded hydrogen atoms in component (B) promoted by the platinum base catalyst.

Examples of suitable organic peroxides include benzoyl peroxide, bis(4-methylbenzoyl)peroxide, 2,4-dichlorobenzoyl peroxide, p-chlorobenzoyl peroxide, dicumyl peroxide, bis(t-butyl)peroxide, 2,5-dimethyl-2,5-bis(t-butylperoxy)hexane, and t-butylcumyl peroxide.

The organic peroxide is used in an effective amount, preferably of 0.1 to 10 parts by weight, more preferably 0.5 to 5 parts by weight per 100 parts by weight of components (A) and (B) combined.

In the other crosslinking agent (C) comprising an organohydrogenpolysiloxane/platinum base catalyst system, the organohydrogenpolysiloxane (a) should have at least two silicon atom-bonded hydrogen atoms (Si—H radicals) in a molecule. It may have a straight, branched or cyclic structure. Illustrative examples are those having the structures shown by the following formulae.

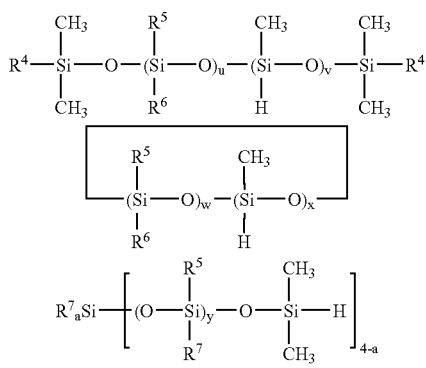

Herein $R^4$ is hydrogen or a monovalent hydrocarbon radical, $R^5$, $R^6$ and $R^7$ each are a monovalent hydrocarbon radical, u is an integer of 0 to 500, v is an integer of 2 to 500, x is an integer of 2 to 6, w is an integer of 0 to 4, y is an integer of 0 to 300, and "a" is an integer of 0 to 2.

The monovalent hydrocarbon radicals represented by $R^4$ to $R^7$ are preferably substituted or unsubstituted monovalent hydrocarbon radicals having 1 to 10 carbon atoms, for example, alkyl radicals such as methyl, ethyl, propyl, butyl, pentyl, and hexyl, aryl radicals such as phenyl, tolyl and xylyl, and halogenated alkyl radicals such as chloromethyl and 3,3,3-trifluoropropyl.

The organohydrogenpolysiloxane is preferably used in an amount to give 0.2 to 30 mol, more preferably 0.5 to 10 mol of silicon atom-bonded hydrogen atoms per mol of alkenyl radicals in components (A) and (B). If the amount of silicon atom-bonded hydrogen atoms is less than 0.2 mol or more than 30 mol, adhesiveness may be lost.

Examples of the platinum base catalyst (b) include, but are not limited to, chloroplatinic acid, alcohol-modified chloroplatinic acid, platinum-olefin complexes, platinum-vinylsiloxane complexes, platinum black, and solid platinum on carriers such as alumina and silica.

The platinum base catalyst is used in a catalytic amount, preferably to give 0.1 to 1,000 ppm, more preferably 1 to 500 ppm of platinum metal based on the total weight of components (A) and (B).

While the silicone adhesive of the invention includes components (A), (B) and (C) defined above, optional components may be added to the adhesive composition if necessary and insofar as this does not compromise the objects of the invention. For example, for ease of coating and forming of the inventive silicone adhesive, an organic solvent for dilution such as toluene, xylene, hexane, heptane, ethanol, isopropyl alcohol, acetone or methyl ethyl ketone may be used. For ease of working, a crosslinking reaction inhibitor such as acetylene alcohol, a nitrogenous compound, sulfurous compound or phosphorous compound may be added. Other additives may also be incorporated, for example, fillers such as silica flour, titanium oxide, carbon black and electroconductive particles, inorganic or organic pigments, dyes and wetting agents.

The inventive silicone adhesive can be prepared by mixing components (A) to (C) and optional components in a conventional manner.

The inventive silicone adhesive thus obtained may be used in several ways. A first way of use is by applying the adhesive directly onto one surface of a substrate (to be bonded) to a desired thickness. Alternatively a solution of the adhesive in a solvent is applied to one substrate surface and dried. Then a surface of another substrate is press bonded to the adhesive layer to establish pressure-sensitive adhesion. A desired step (temporary tack or sawing) is carried out, after which the assembly is heated to establish a bond.

A second way of use is to use the silicone adhesive in a film form. The film form is prepared by applying the silicone adhesive directly to a sheet-like support having a release agent coated thereon or by applying a solution of the adhesive in a solvent and drying, to form a silicone adhesive film, and laying a release sheet on top thereof to form a laminate. On use, the release sheet is peeled from the film form, the film form is press bonded to a desired substrate, a desired step is carried out in this state, after which the remaining release sheet (support) is peeled off, and the film form is press bonded to another substrate and heated to establish a bond. Alternatively, the film form is press bonded to a desired substrate, the remaining release sheet (support) is then peeled off, the substrate having the adhesive film borne thereon is press bonded to another substrate, and a desired step is carried out in this state, after which the assembly is heated to establish a bond. The application of the inventive adhesive to the dicing/die bonding tape corresponds to the former of the second way of use. More particularly, the release sheet is peeled from the film form, the film form is press bonded to a wafer, a dicing step is carried out in this state to saw and divide the wafer into semiconductor chips, after which each semiconductor chip having the silicone adhesive attached thereto is peeled from the remaining release sheet (support), press bonded to another substrate, typically a lead frame and heated to establish a bond, thereby fabricating a semiconductor device.

In these embodiments, the adhesive film may be one which is obtained by forming the adhesive into a film shape and crosslinking and curing the adhesive.

Suitable materials of which the sheet-like support used in the processing of the silicone adhesive into a film shape is made include polyethylene, polypropylene, polyester, polyamide, polyimide, polyamide-imide, polyether-imide, polytetrafluoroethylene, paper and metal foil, but are not limited thereto.

The thickness of the silicone adhesive film is not critical and may be selected as appropriate for a particular purpose. The film thickness is ordinarily in the range of 0.01 to 0.1 mm.

When a solution of the inventive silicone adhesive in a solvent is applied and dried to form an adhesive layer, the drying conditions which vary with a film thickness include at least 2 hours at room temperature and 1 to 20 minutes at 40 to 130° C., both at a film thickness in the ordinary range. Moderate conditions are preferred if allowable. Higher temperatures in excess of 130° C. or longer heating times are undesirable because component (B) for promoting adhesion can be altered to inhibit adhesion. The inventive adhesive layer may be kept not only in a dry state with the solvent removed as mentioned above, but also in a crosslinked state as long as initial tackiness is maintained. The crosslinking conditions may be similar to the drying conditions. Moderate crosslinking conditions are preferred because higher temperatures in excess of 130° C. or longer heating times can inhibit adhesion.

The substrates to which the inventive silicone adhesive can be applied include metals such as Fe, Al, Cr, Ni, Si, Cu, Ag and Au; inorganic materials and ceramics such as glass, silicon nitride and silicon carbide; and organic materials such as epoxy, bakelite, polyimide, polyamide, polyester and silicone resins.

Preferred conditions under which the inventive silicone adhesive layer between various substrates is heated to establish a bond include a temperature of 100 to 250° C. and a time of 15 to 60 minutes.

EXAMPLE

Synthesis Examples, Examples and Comparative Examples are given below for further illustrating the invention. These examples are not to be construed as limiting the invention thereto. All parts and percents are by weight.

Synthesis Example 1 of Component (A)

In 100 parts of toluene were dissolved 50 parts of a methylpolysiloxane resin consisting of 1.1 mol of $(CH_3)_3$

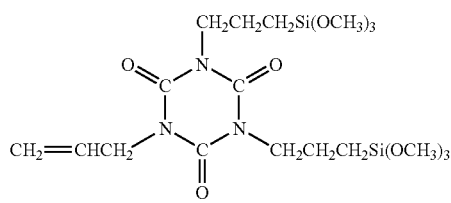

$SiO_{1/2}$ units and 1 mol of $SiO_{4/2}$ units and containing 0.07 mol per 100 g of hydroxyl radicals and 50 parts of a gum-like dimethylpolysiloxane end-capped with a hydroxyl radical and having a degree of polymerization of 2,000. To the solution was added 0.5 part of 28% aqueous ammonia. The solution was stirred at room temperature for 16 hours for condensation reaction to take place. By heating at 120-130° C., the condensation water was removed through azeotropic dehydration. Toluene was added to the residue to a nonvolatile (150° C./30 min) concentration of 40%, yielding a silicone partial condensate I.

Synthesis Example 2 of Component (A)

The procedure of Synthesis Example 1 was repeated aside from using 50 parts of a methylpolysiloxane resin consisting of 0.75 mol of $(CH_3)_3SiO_{1/2}$ units and 1 mol of $SiO_{4/2}$ units and containing 0.05 mol per 100 g of hydroxyl radicals, 50 parts of a gum-like dimethylpolysiloxane end-capped with a hydroxyl radical, containing 0.054 mol % of pendant vinyl radicals and having a degree of polymerization of 2,000, 100 parts of toluene, and 0.5 part of 28% aqueous ammonia.

There was obtained a silicone partial condensate II having a nonvolatile (150° C./30 min) concentration of 40%.

Using each of the silicone partial condensates thus synthesized as component (A), a silicon adhesive coating solution was prepared according to the formulation shown in Examples.

Example 1

A silicon adhesive coating solution was prepared by mixing 100 parts of silicone partial condensate I as component (A), 5 parts of a compound of the structural formula shown below as component (B), and 0.5 part of bis(4-methylbenzoyl)peroxide as component (C).

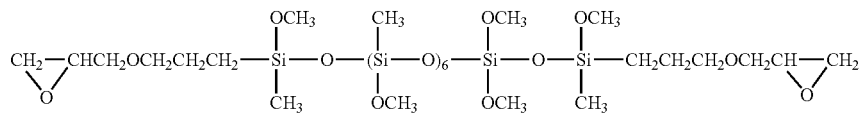

Example 2

A silicon adhesive coating solution was prepared by mixing 100 parts of silicone partial condensate I as component (A), 5 parts of a compound of the structural formula shown below as component (B), and 0.5 part of bis(4-methylbenzoyl)peroxide as component (C).

Example 3

A silicon adhesive coating solution was prepared by mixing 100 parts of silicone partial condensate II as component (A), 5 parts of a compound of the structural formula:

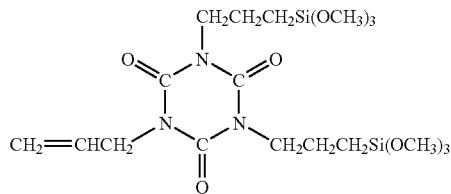

as component (B), 1.29 parts of an organopolysiloxane compound having silicon atom-bonded hydrogen atoms represented by the structural formula:

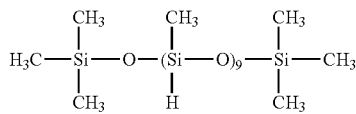

and an amount to give 10 ppm platinum of a 2-ethylhexanol-modified chloroplatinic acid solution as component (C), and 0.05 part of 3-methyl-1-butyn-3-ol as a reaction inhibitor.

Example 4

A silicon adhesive coating solution was prepared by mixing 100 parts of silicone partial condensate II as component (A), 5 parts of a compound of the structural formula shown below as component (B), and 1 part of 2,5-dimethyl-2,5-bis(t-butylperoxy)hexane as component (C).

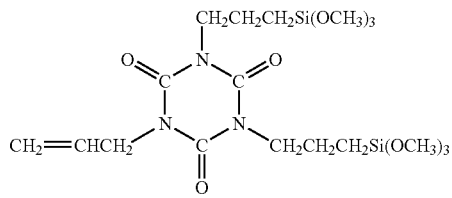

Example 5

A silicon adhesive coating solution was prepared by mixing 100 parts of silicone partial condensate II as component (A), 3 parts of a compound of the structural formula:

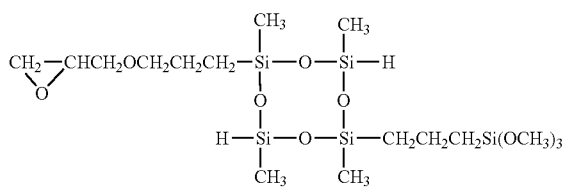

as component (B), 1.29 parts of an organopolysiloxane compound having silicon atom-bonded hydrogen atoms represented by the structural formula:

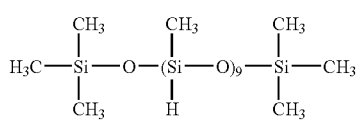

and an amount to give 10 ppm platinum of a 2-ethylhexanol-modified chloroplatinic acid solution as component (C), and 0.05 part of 3-methyl-1-butyn-3-ol as a reaction inhibitor.

Comparative Example 1

A silicon adhesive coating solution was prepared as in Example 1 aside from omitting component (B), that is, by mixing 100 parts of silicone partial condensate I as component (A) and 0.5 part of bis(4-methylbenzoyl)peroxide as component (C).

Comparative Example 2

A silicon adhesive coating solution was prepared as in Example 3 aside from omitting component (B), that is, by mixing 100 parts of silicone partial condensate II as component (A), 0.39 part of an organopolysiloxane compound having silicon atom-bonded hydrogen atoms represented by the structural formula:

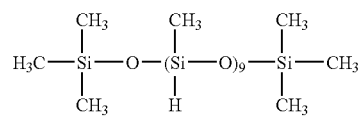

and an amount to give 10 ppm platinum of a 2-ethylhexanol-modified chloroplatinic acid solution as component (C), and 0.05 part of 3-methyl-1-butyn-3-ol as a reaction inhibitor.

Measurement of Tackiness

Each of the silicone coating solutions of Examples and Comparative Examples was applied onto a polyimide film of 25 mm wide and 25 μm thick and dried under either of two sets of conditions of holding at room temperature for 6 hours and heating at 120° C. for 5 minutes, to form a silicone adhesive layer of about 50 μm thick, producing a pressure-sensitive adhesive tape. The tape with the coated surface down was longitudinally attached to a SUS27CP stainless steel plate (30 mm wide and 1.0 mm thick). A roller covered with a rubber sleeve of about 6 mm thick and having a weight of 2,000±50 grams was rolled once back and forth on the tape at a (press bonding) speed of about 300 mm/min for press bonding the adhesive tape to the steel plate. The assembly was allowed to stand at a constant temperature and humidity of 25±2° C. and 50±5% RH, respectively, over 30 minutes. Thereafter, the adhesive tape was turned back 180° and pulled away at a rate of 300 mm/min while a peeling force was measured. The results are shown in Table 1.

Measurement of Adhesiveness

Each of the silicone coating solutions of Examples and Comparative Examples was applied onto a PET film of 50 μm thick coated with a fluorosilicone parting agent and dried under either of two sets of conditions of holding at room temperature for 6 hours and heating at 120° C. for 5 minutes, to form a silicone adhesive layer of about 50 μm thick, producing an adhesive tape. The tape was cut into pieces of 25 mm long and 10 mm wide, which were attached to substrates of stainless steel (SUS), aluminum, silicon wafer, glass and polyimide film. The PET film was peeled off and a substrate of the same type was placed to sandwich the adhesive layer between the substrates. The sample was press bonded under a load of 2,000 grams for one minute. It was further heated at 175° C. for 60 minutes whereupon a shear bond strength was measured. The results are also shown in Table 1.

TABLE 1

| | Molding conditions | Substrate | Example 1 | 2 | 3 | 4 | 5 | Comparative Example 1 | 2 |
|---|---|---|---|---|---|---|---|---|---|
| Tackiness or peeling force (N/25 mm) | RT/6 hr | SUS | 8.5 | 8.6 | 8.3 | 9.0 | 8.9 | 8.8 | 9.2 |
| | 120° C./5 min | SUS | 8.9 | 8.9 | 6.3 | 9.0 | 6.5 | 9.0 | 6.5 |
| Adhesiveness or bond strength (MPa) | RT/6 hr | SUS | 3.2 | 2.6 | 3.2 | 3.1 | 2.5 | 0.25 | 0.31 |
| | | Aluminum | 3.4 | 2.7 | 3.3 | 3.4 | 2.8 | 0.27 | 0.35 |
| | | Silicon wafer | 3.1 | 2.4 | 2.9 | 3.0 | 2.7 | 0.22 | 0.31 |
| | | Glass | 3.3 | 2.8 | 3.4 | 3.3 | 2.9 | 0.26 | 0.36 |
| | | Polyimide | 3.1 | 2.2 | 3.1 | 3.0 | 2.4 | 0.25 | 0.33 |
| After 175° C./60 min heating | 120° C./5 min | SUS | 2.5 | 1.9 | 2.2 | 2.7 | 1.9 | 0.29 | 0.53 |
| | | Aluminum | 2.8 | 2.0 | 2.6 | 2.9 | 2.1 | 0.30 | 0.56 |
| | | Silicon wafer | 2.4 | 1.8 | 2.1 | 2.7 | 2.0 | 0.29 | 0.51 |
| | | Glass | 2.8 | 2.2 | 2.7 | 3.0 | 2.2 | 0.34 | 0.58 |
| | | Polyimide | 2.4 | 1.8 | 2.2 | 2.5 | 1.9 | 0.31 | 0.53 |

The silicone adhesive of the invention exhibits at the initial a tackiness (or pressure-sensitive adhesion) sufficient to fixedly secure a substrate for allowing a desired step (cutting or the like) to be performed on the substrate. By press bonding another substrate to the adhesive-bearing substrate and heating them, the substrates can be firmly bonded together.

The silicone adhesive of the invention can be supplied in a film form which is easy to handle and avoids the contamination of the surrounding with fluid ingredients which occurs with liquid adhesives. Owing to these benefits, the adhesive film of the invention can be advantageously used as the dicing/die bonding tape in the manufacture of semiconductor devices.

Japanese Patent Application No. 2002-240373 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone adhesive exhibiting pressure-sensitive adhesion and permanent adhesion, comprising
   (A) 100 parts by weight of an organopolysiloxane partial condensate obtained by partial condensation of (i) a diorganopolysiloxane having a hydroxyl radical at an end of its molecular chain, represented by the following general formula (1):

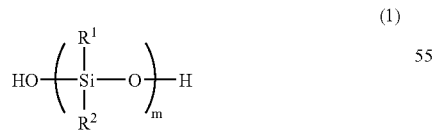

(1)

wherein $R^1$ and $R^2$ each are a substituted or unsubstituted monovalent hydrocarbon radical, wherein the diorganopolysiloxane further contains alkenyl radicals in amount of 0.02 to 0.5 mol % based on the total of $R^1$ and $R^2$, and m is an integer of 500 to 10,000, with (ii) an organopolysiloxane copolymer having hydroxyl radicals in a molecule and consisting essentially of $R^3_3SiO_{1/2}$ units and $SiO_{4/2}$ units in a molar ratio of $R^3_3SiO_{1/2}$ units to $SiO_{4/2}$ units of from 0.5 to 1.5, wherein $R^3$ is a hydroxyl radical or a substituted or unsubstituted monovalent hydrocarbon radical, (B) 0.1 to 20 parts by weight of:

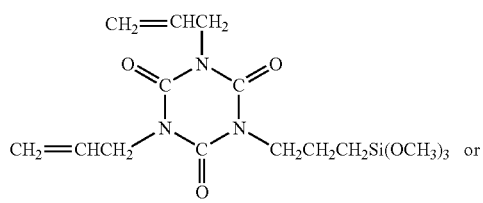

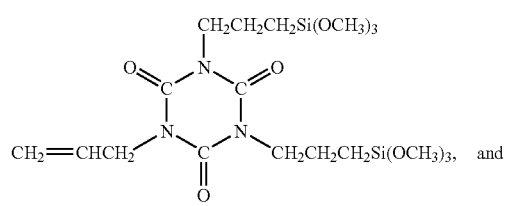

(C) a crosslinking agent comprising (a) an organohydrogenpolysiloxane having at least two silicon atom-bonded hydrogen atoms in a molecule, in an amount to give 0.2 to 30 mol of silicon atom-bonded hydrogen atoms per mol of alkenyl radicals in components (A) and (B), and (b) a catalytic amount of a platinum base catalyst.

2. A silicone adhesive film prepared by forming the adhesive of claim 1 into a film shape.

3. A silicone rubber adhesive film prepared by forming the adhesive of claim 1 into a film shape, followed by crosslinking and curing.

4. A silicone adhesive exhibiting pressure-sensitive adhesion and permanent adhesion, said silicon adhesive comprising:
   (A) 100 parts by weight of an organopolysiloxane partial condensate obtained by partial condensation of (i) a diorganopolysiloxane having a hydroxyl radical at an end of its molecular chain, represented by the following general formula (1):

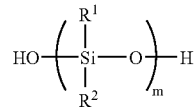
(1)

wherein $R^1$ and $R^2$ each are a substituted or unsubstituted monovalent hydrocarbon radical, wherein the diorganopolysiloxane further contains alkenyl radicals in amount of 0.02 to 0.5 mol % based on the total of $R^1$ and $R^2$, and m is an integer of 500 to 10,000, with (ii) an organopolysiloxane copolymer having hydroxyl radicals in a molecule and consisting essentially of $R^3{}_3SiO_{1/2}$ units and $SiO_{4/2}$ units in a molar ratio of $R^3{}_3SiO_{1/2}$ units to $SiO_{4/2}$ units of from 0.5 to 1.5, wherein $R^3$ is a hydroxyl radical or a substituted or unsubstituted monovalent hydrocarbon radical, (B) 0.1 to 20 parts by weight of:

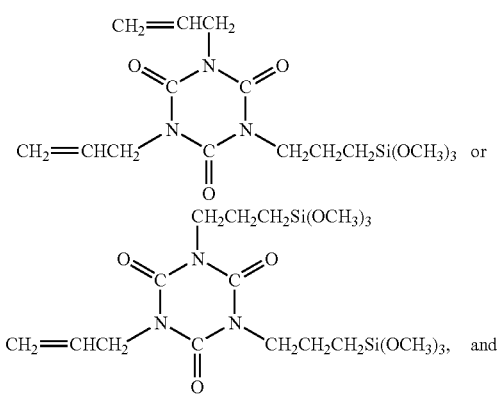

(C) (a) an organohydrogenpolysiloxane having at least two silicon atom-bonded hydrogen atoms in a molecule, in an amount to give 0.2 to 30 mol of silicon atom-bonded hydrogen atoms per mol of alkenyl radicals in components (A) and (B), and (b) a catalytic amount of a platinum base catalyst.

5. A silicone adhesive film prepared by forming the adhesive of claim 4 into a film shape.

6. A silicone rubber adhesive film prepared by forming the adhesive of claim 4 into a film shape, followed by crosslinking and curing.

7. A silicone adhesive exhibiting pressure-sensitive adhesion and permanent adhesion, comprising:
(A) 100 parts by weight of an organopolysiloxane partial condensate obtained by partial condensation of (i) a diorganopolysiloxane having a hydroxyl radical at an end of its molecular chain, represented by the following general formula (1):

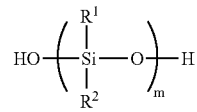
(1)

wherein $R^1$ and $R^2$ each are a substituted or unsubstituted monovalent hydrocarbon radical, and m is an integer of 500 to 10,000, with (ii) an organopolysiloxane copolymer having hydroxyl radicals in a molecule and consisting essentially of $R^3{}_3SiO_{1/2}$ units and $SiO_{4/2}$ units in a molar ratio of $R^3{}_3SiO_{1/2}$ units to $SiO_{4/2}$ units of from 0.5 to 1.5, wherein $R^3$ is a hydroxyl radical or a substituted or unsubstituted monovalent hydrocarbon radical, (B) 0.1 to 20 parts by weight of:

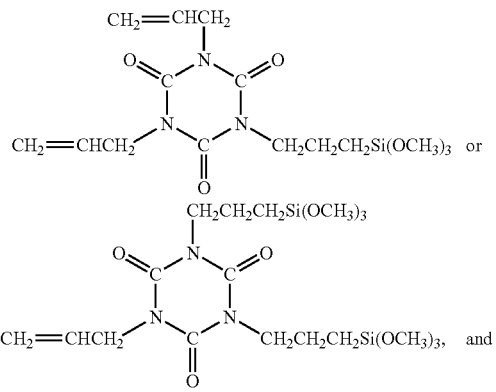

(C) a crosslinking agent in the form of an organic peroxide.

8. A silicone adhesive film prepared by forming the adhesive of claim 7 into a film shape.

9. A silicone rubber adhesive film prepared by forming the adhesive of claim 7 into a film shape, followed by crosslinking and curing.

* * * * *